United States Patent [19]

Qizhen

[11] Patent Number: 4,721,177

[45] Date of Patent: Jan. 26, 1988

[54] DEVICE FOR DIRECT DRIVING OF WHEELS

[76] Inventor: Wang Qizhen, 5 Zigiang Street, Chang-chun, China

[21] Appl. No.: 844,176

[22] Filed: Mar. 26, 1986

[30] Foreign Application Priority Data

Apr. 1, 1985 [CN] China .................. 85101503

[51] Int. Cl.⁴ .................................. B62M 7/12
[52] U.S. Cl. .................. 180/205; 180/219; 123/193 P
[58] Field of Search .............. 180/219, 205, 206, 207, 180/230, 165; 123/193 P

[56] References Cited

U.S. PATENT DOCUMENTS

| | | | |
|---|---|---|---|
| 904,721 | 11/1908 | Perillard | 180/205 |
| 1,247,752 | 11/1917 | Van Antwerp | 180/206 |
| 3,626,815 | 12/1971 | Fingeroot et al. | 123/193 P |
| 3,943,908 | 3/1976 | Kubis et al. | 123/193 P |
| 4,091,887 | 5/1978 | Kurata | 180/230 |
| 4,574,652 | 3/1986 | Shichinohe et al. | 180/230 X |

FOREIGN PATENT DOCUMENTS 0043147  1/1982  European Pat. Off. ........ 123/193 P
981787   5/1951  France ......................... 180/205

*Primary Examiner*—John A. Pekar
*Attorney, Agent, or Firm*—Arnold, White & Durkee

[57] ABSTRACT

A device for direct-driving of wheels, adapted for various minivehicles, in particular, for bicycles, motorbikes, or motorcycles. The device comprises a fixed wheel axle, a wheel hub rotating about said wheel axle, an engine, and transmission units. Said engine and transmission units are enclosed inside the wheel hub; the engine's crankshaft is disposed offset from and parallel to the wheel axle; the transmission units have an overrunning clutch. The wheel hub is supported at both sides thereof. The transmission units can be completely disengaged from the wheel hub when the engine is stopped. A simple, safe and convenient conversion between the manpower-drive mode and the engine-drive mode is ensured on a vehicle equiped with the device.

13 Claims, 7 Drawing Figures

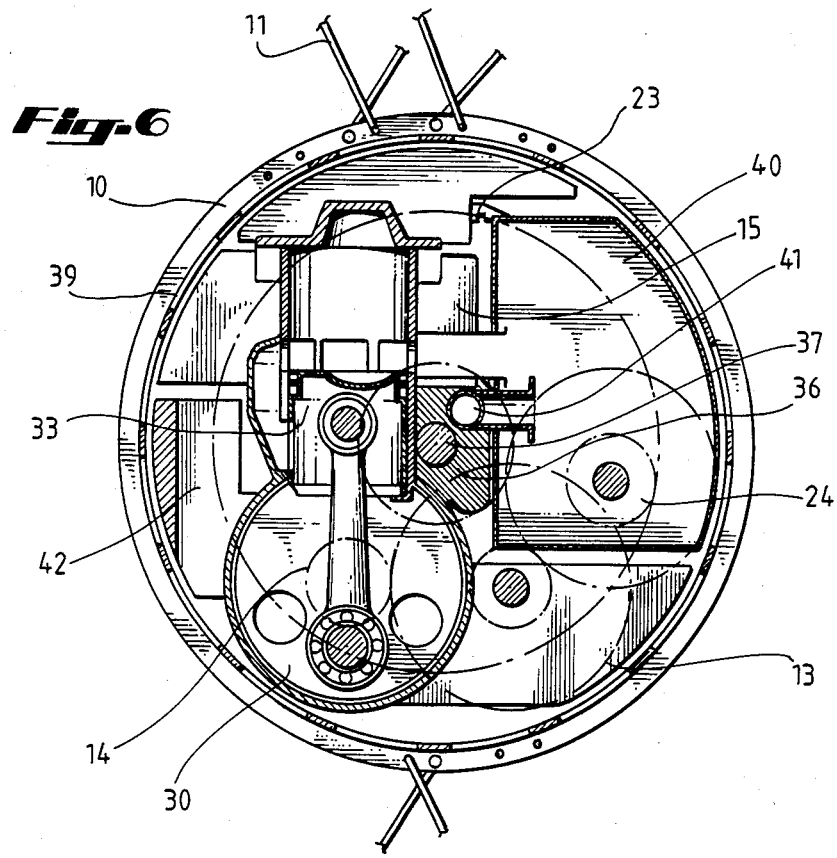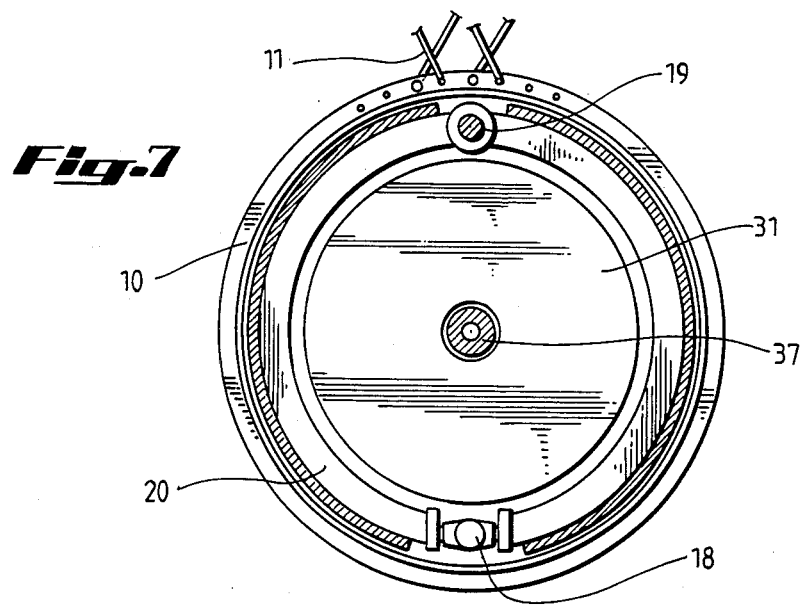

DEVICE FOR DIRECT DRIVING OF WHEELS

This invention relates to an appartus used to directly drive wheels, and in particular to an apparatus for driving the wheels of motorcycles, motorbikes, or motor vans. Further, an apparatus according to the present invention can also be fitted on common bicycles.

Some devices for direct-driving wheels have already been proposed, for example in U.S. Pat. No. 4,132,281 published on Jan. 2, 1979, wherein an engine and drive mechanism are disclosed as being arranged in the inner space of a hub between two bike frames as shown in FIG. 1.

But in known prior art devices, the crankshaft of the engine has generally been arranged coaxially to the wheel, and the longitudinal symmetrical plane of the engine body was coincident with the symmetrical plane of the wheel. The need to maintain a certain piston stroke has forced the hub to be radially oversized; further, installing the reduction drive mechanism, magneto, and cooling fan outside the engine body has rendered known devices axially oversized, as well as overweight. Furthermore, the support bearings of the hub have been positioned offset from the central symmetrical plane of the wheel, thereby increasing the load on the bearing and decreasing the stability of the wheel. Further, it requires a substantial amount of muscle to manually drive the wheel because gears have to be driven when the engine is at rest and is disengaged from the hub.

In order to solve the problems mentioned above, this invention presents a novel device for directly driving wheels. Accordingly, it is an object of the present invention to reduce the axial and radial size and weight of the hub having an engine and transmission fitted thereupon, so as to make it suitable for lightweight vehicles, especially for common bicycles while assuring that the power output of the engine, and the efficiency and reliability of the drive system are adequate. Further, according to the present invention, the hub is supported at both sides, thereby improving the loading condition of the hub bearings, and stability of the wheel. Furthermore, according to the present invention, the reduction drive system may be completely disengaged from the hub when the engine is stopped, so as to permit easy manual propulsion. Still further, the present invention ensures a simple, safe and convenient conversion between the manual propulsion mode and engine driven mode, as well as an incorporation of the two when necessary.

The apparatus according to the present invention may be adapted for various kinds of light weight vehicles, particularly for bicycles, motorbikes, or motorcycles. The apparatus comprises an engine transmission, a fixed wheel axle, a wheel hub and a set of actuating mechanisms, wherein the engine and the parts of the transmission are all arranged inside the hub, located at the center of the wheel.

The engine mounted in the hub is a two-stroke gasoline engine, the longitudinal axis of the cylinder body lying in the orthogonal plane of the wheel axle, or, in other words, perpendicularly intersecting the axial line of the wheel. The main journals of the crankshaft are offset from, and parallel with, the wheel axle. The crankshaft has one end mounted with a magneto rotor and another end connected with the transmission via a clutch. The axial distance between the magneto rotor and rotatable members of the clutch is smaller than the diameter of the cylinder. The reciprocating piston in the engine cylinder has a recess on its top surface. A pair of lugs extending from the inner side of the top section of the piston forms piston seatings for mounting the piston pin therein. The piston skirt portion has a thin-wall structure; parts of the piston skirt which are near the axial line of the piston pin are cut off to form openings. The vertical distance from the lowest point of the skirt to the axial line of the crankshaft is smaller than the gyro radius of said magneto and clutch means when the piston is at the bottom dead center.

In an apparatus according to the present invention, an overrunning clutch is used at the last stage of the transmission to transmit the propulsion power of the engine. The overrunning clutch also makes it possible to rotate the wheel in both forward and backward directions easily when the engine stops. It is also possible to add manpower to the wheel in case the engine suffers an overload situation, such as when the slope of the road is excessively big.

The engine starting system in an apparatus according to the present invention transmits the rotation of the hub to the engine crankshaft through the meshing of the gear clutch in the transmission. After the engine is started, the gear clutch turns to be inactive, and the driving force of the engine is transmitted to the wheel by means of the friction of flying-weights of a centrifugal friction clutch and the overrunning clutch; the result being to avoid damage to the teeth of the gear clutch. The relative sliding between the flying-weights and the outer dish of the centrifugal friction clutch, and between the driving and driven members of the overrunning clutch, can provide protection to the engine and transmission in case of overload.

An impulse-proof type of gear drive mechanism, for example a spiral tooth gear, arc tooth gear, or involute herringbone tooth gear drive mechanism, may be used in the apparatus to raise the stability and smoothness of power transmission, wherein the rim of a large gear is separated from its hub portion, with an elastic ring being fitted in between, in order to reduce impulse and shock when the engine is being started.

A brake means, composed of brake shoes and the wall of the wheel hub is provided for the purpose of braking the wheel quickly and reliably.

Two vertical side walls of the wheel hub are supported on the wheel axle shaft, and on a boss ring axially protruding from the engine body which is fixed to the shaft via bearings, to assure a better loading of the bearings and a stable and reliable support of the wheel.

The transmission is disposed in a sealed box located inside the hub, and can be lubricated with liquid lubricant. One side of the sealed box is fixed to the crankcase of the engine. The other side is supported on the axially extending portion of an internal gear via a bearing, with sealing rings being provided thereto.

Channels are provided in the boss ring to allow the insertion of oil inlet pipes, various actuating means and exhaust pipes. Besides, there are openings provided on the wall of the wheel hub of the device to facilitate ventilation and maintenance. It is also appropriate to provide the hub wall with blades for introducing cooling air.

The conversion between the manual drive mode, the engine drive mode, and the speed regulation of the engine drive mode, are integrally controlled by handles.

For a better understanding of the nature and characteristics of the present invention, the embodiments according to the present invention are shown in detail by way of the following accompanying drawings in which:

FIG. 6 is a schematic view showing the arrangement of the engine and the transmission units in the wheel hub;

FIG. 7 is a diagrammatic sketch of the brake of an embodiment of the present invention.

DETAILED DESCRIPTION OF THE PREFERRED EMBODIMENT

Figure 1:
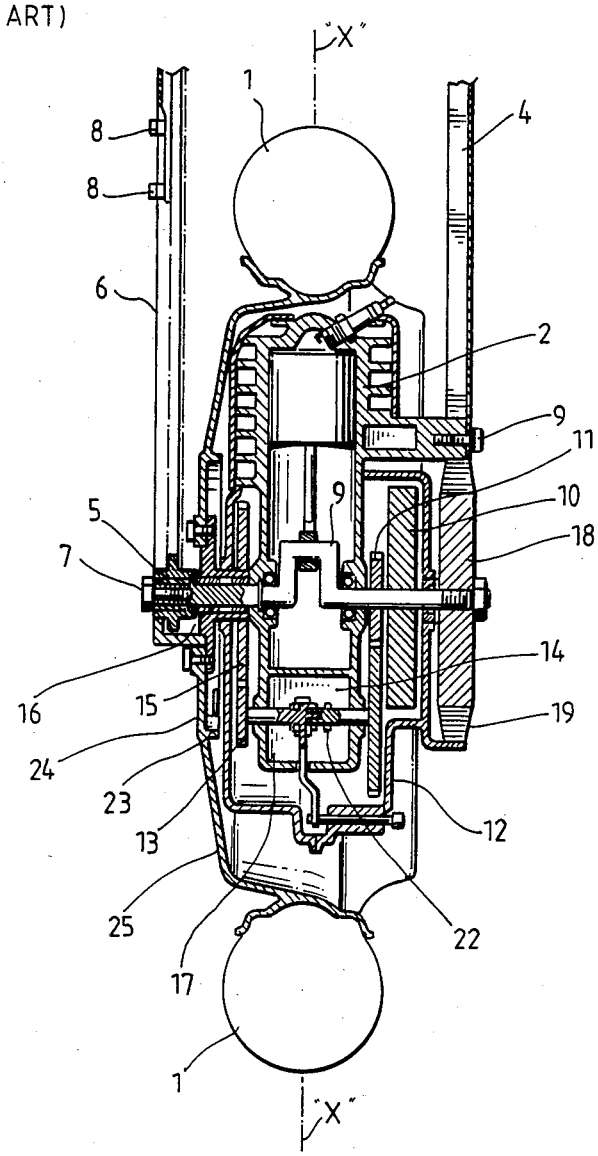
FIG. 1 is an outline view of a drive device according to the prior art.
Figure 2:
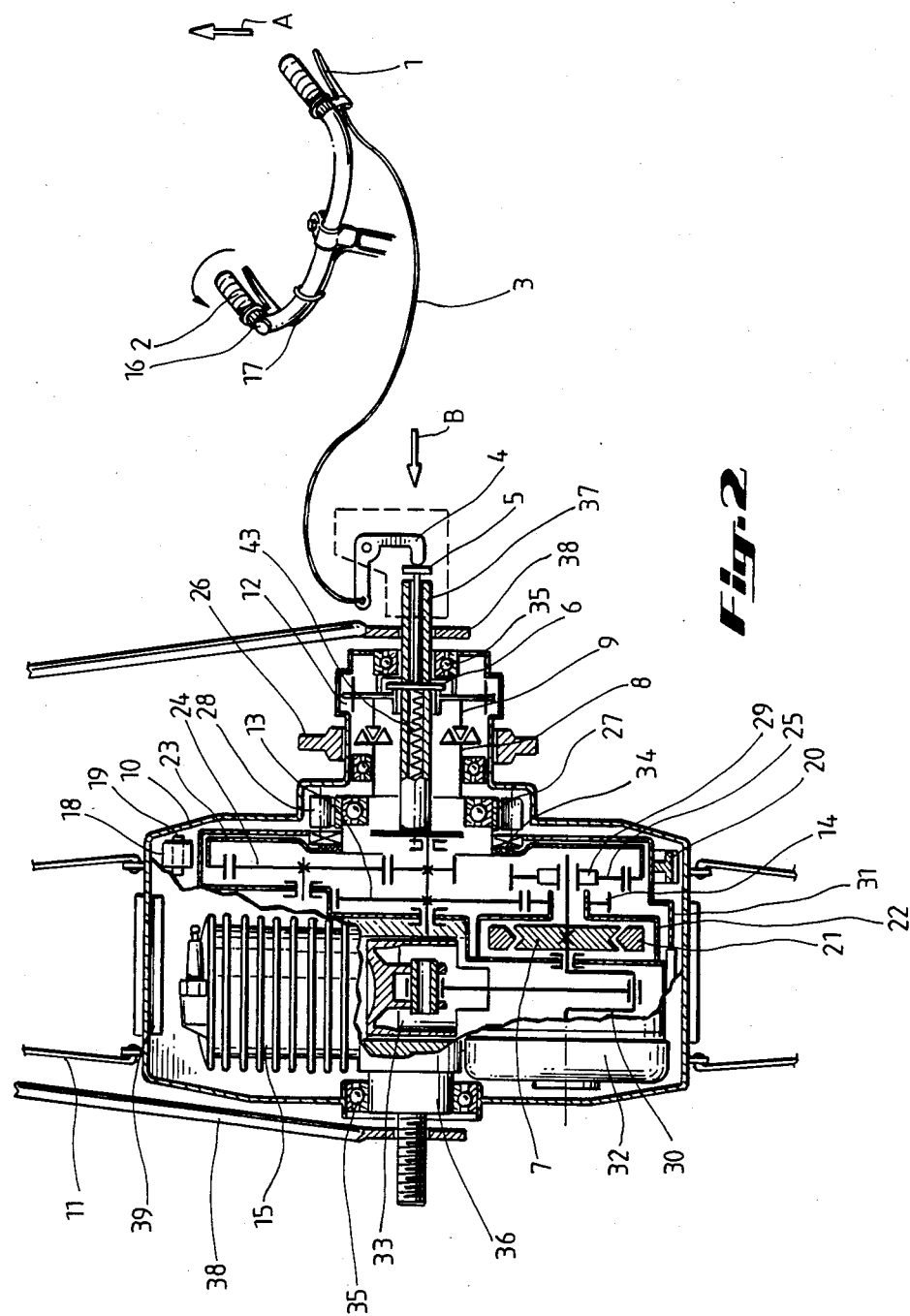
FIG. 2 is a schematic drawing of an embodiment of the present invention.

Referring to FIG. 2, an embodiment of the present invention is shown, wherein a wheel axle shaft 37 is fixed on a vehicle frame 38. The axle shaft 37 may be either a single part, or composed of two aligned semishafts. On the wheel axle shaft 37 is fixed a two-stroke gasoline engine 15. A boss ring 36, having axial openings protruding outwardly along the axis of the wheel axle 37, is fixed to the axle 37 on the side of the engine body.

The two side walls of a wheel hub 10 are supported via bearings 35 on the wheel axle shaft 37 and the boss ring 36, respectively. The wheel hub 10 may have spokes 11 and a flywheel 26 mounted on the outer peripheral wall thereof, as in the case of use of an apparatus according to the present invention with a conventional bicycle. Inside the wheel hub 10, the longitudinal axis of the cylinder of the engine 15 lies in the orthogonal plane of the wheel-axle 37, or, in other words, perpendicularly intersects the longitudinal axis of the wheel axle 37. Inside the cylinder there is a piston 33, which has a spherical recess formed on the top thereof, and a pair of lugs provided at the inner side near the top of the piston to form a seating for a short piston pin. The piston skirt has a thin-wall structure with good elasticity. The main journals of the crankshaft 30 of the engine 15 are offset from, and parallel to, the wheel axle 37. Two ends of the crankshaft 30 extend out of the side walls of the engine crankcase, one end has a magneto 32 mounted thereon, the other end extends into a gear box 31 to have a centrifugal frictional clutch and a starting gear 25 mounted thereon. The axial distance between the opposing gyral planes of the magneto 32 rotor and the centrifugal frictional clutch is smaller than the diameter of the cylinder bore. The vertical distance from the lowest edge of the piston 33 skirt to the axial line of the main journals of the crankshaft 30 is smaller than the gyro radius of the said magneto 32 and said clutch, when the piston 33 is at its bottom dead center. Portions of the piston 33 skirt near the side walls of the crankcase and near the axis of the piston pin are cut off to form an asymmetrical skirt so as to avoid interference and ensure better flow of the mixture charge.

Referring to FIGS. 2 and 6, a carburetor 42 is attached to the intake port on the wall of the crankcase of the engine 15. An exhaust silencer 40 is attached to the exhaust port of the engine 15, with the tail pipe 41 extending out through the opening on the boss ring 36, as shown in the FIG. 6.

Referring again to FIG. 2, the gear box 31, located inside the wheel hub 10, is rigidly connected to the crankcase of the engine 15. At least two stages of gear transmissions, and a starting mechanism are provided in the gear box 31. The actuating means of the starting mechanism extend through an axial opening in the wheel axle 37, out of the wheel hub 10, and are connected to a handle bar 2 of the vehicle. To be specific, the actuating means has a handle 1, movable along the direction A shown in FIG. 2, a wire 3 connecting handle 1, and a lever 4. Lever 4 coacts with a push rod 5 movably disposed in the axial opening in the wheel axle 37, and abutts against the lever 4 at one end, and a transverse pin 6 at the other end.

Figure 3:
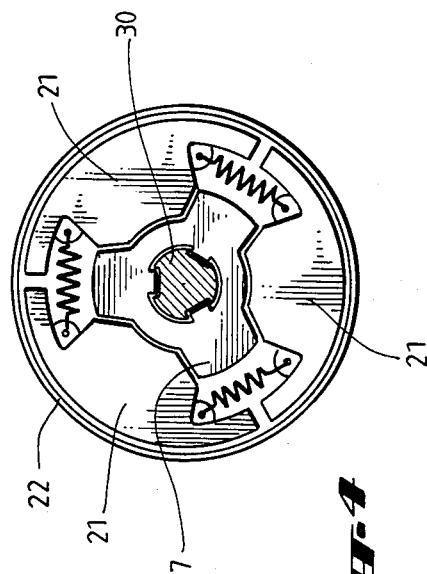
FIG. 3 is a cross section view of the overrunning clutch located on the starting gear of an embodiment of the present invention.

A right part 9 of a gear clutch is slidably connected to the wheel hub 10 via a spline 12, and may be pushed by the rod 5 and the pin 6 to move in the direction B against the biasing force of the spring 43, to mesh with the left part 8 of the gear clutch. The left part 8 is fixed on the internal gear 23 which has a cylindrical central sleeve axially protruding out of the gear box 31, with bearings and sealing rings 34 disposed therebetween. The starting gear 25 is coactable with the internal gear 23, is mounted on the crankshaft 30 via a roller type overrunning clutch 29. The overrunning clutch 29 is formed in such a manner that its driving ring is formed by the wedging recesses on the inner peripheral surface of the starting gear 25. The driven ring of the clutch 29 is formed by the cylindrical surface of the main journal of the crankshaft 30, as shown in FIG. 3.

Referring again to FIG. 2, the centrifugal frictional clutch mounted on the crankshaft 30 adjacent the starting gear 25 consists of a central portion 7, flyweights 21 and an outer dish 22. A small gear 14 is fixed on the outer dish 22 and engages with a duplex gear 13 supported on the gear box 31. A gear 24 supported on the gear box 31 engages with both the gear 13 and the internal gear 23. The gear 24 may be either a single or a duplex gear as shown in FIG. 2 and FIG. 6, the difference being determined by the specific requirement for the transmission ratio.

Figure 5:
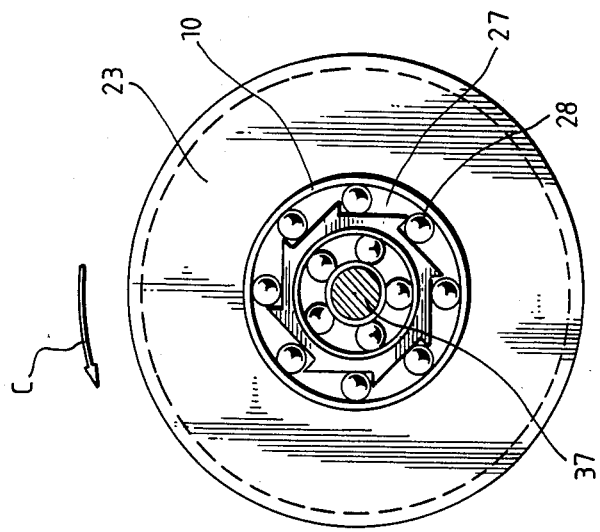
FIG. 5 is an elevational view of the overrunning clutch located on the internal gear of an embodiment of the present invention.

Referring to FIGS. 2 and 5, an overrunning clutch 29 is disposed between the outer periphery of the central sleeve of the internal gear 23 and the inner peripheral wall of the wheel hub 10. The overrunning clutch 29 is positioned so that its driving wedge ring 27 is fixed on the central sleeve of the internal gear 23; its driven ring is fixed on, or integrally formed with, the inner wall of the wheel hub 10, and rollers 28 are disposed therebetween, as shown specifically in FIG. 5.

Referring again to FIG. 2, the engine body is firmly fixed to the frame 38 at both ends of the axle shaft 37; therefore, the forward rotation of the wheel hub 10 under the propulsion of the engine 15 is guaranteed, and counter-rotation of the drive unit is prevented. It is recommended to adopt spiral gears or herringbone gears in the above transmission to get a stable and smooth power transmission. The gear box 31 is sealed so as to contain liquid lubricant.

Referring to FIG. 7, a brake means is provided which consists of a brake cam 18, a support shaft 19 attached on the gear box 31, two opposed brake shoes 20, and the inner wall of the wheel hub 10. Referring to FIGS. 2 and 7, the actuating means of the brake can be arranged through the opening on the boss ring 36 to connect with the brake handle 17.

Figure 4:
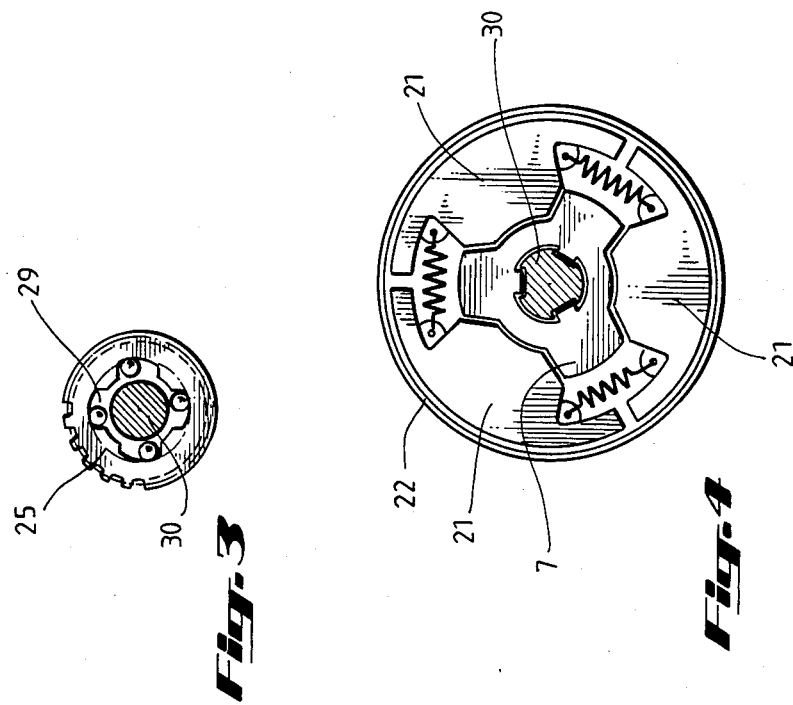
FIG. 4 is an elevational view of the friction flyingweight and outer dish of an embodiment of the present invention.

The propulsion power of the engine is transmitted through the drive unit to the wheel as follows:

After the start of the engine 15, the crankshaft 30 brings the central portion 7 of the centrifugal friction clutch mounted thereon into fast rotation. This causes the flying-weight 21 of the clutch to contact the outer dish 22 of the clutch (see FIG. 4). The friction therebetween causes rotational movement of the dish 22, and consequently of the small gear 14 fixed therewith. Gear 14 engages with the duplex gear 13 which transmits the rotational movement to the internal gear 23 by means of an idler 24. The disc portion of the internal gear 23 has an axially extending central sleeve, on the outer wall of which is provided a wedge ring 27 (as shown in FIG. 5). By means of rollers 28, the wedge ring 27 rotates in the direction shown by the arrow C in FIG. 5, and transmits the propulsion to the hub 10. Since the engine body is firmly fixed to the frame 38 through both ends of the axle shaft 37, the drive device is prevented from being counter rotated. Thus, the wheel hub 10 rotates forwardly under the propulsion. It is recommended to adopt spiral gears or herringbone gears in the above said drive units to get a stable and smooth power transmission.

Referring now to FIG. 5, it is evidence from the trilateral relation of the wedge ring 27, pin rollers 28 and hub 10 that the rotation of the hub 10 alone in the C direction can hardly cause the rotation of the wedge ring 27; therefore, there is hardly any interference between the engine drive mode and the manual drive mode. And, in the case that the engine suffers a temporary overload, the manual drive may be added to the wheel by means of pedals, chain and sprocket.

When an excessive overload does occur (such an encountering sudden obstacle on the road surface, traveling up-hill along a road of an excessively big slope, etc.) the relative sliding between the flying weight 21 (shown in FIG. 2 and r) and the outer dish 22 as well as between the rollers 28 and the hub 10 provide overload protection to the engine.

The method of operating a bicycle equipped with an apparatus according to the present invention may be as follows:

Before starting the engine, rotate the vehicle wheel by any suitable ways (such as pushing, or engaging the well-known pedal, chain and sprocket assembly).

Switch on the electrical circuit of the engine, pull the hand shank 1 located on the left handle bar in the direction shown by the arrow A in FIG. 2. rotate the handle 2, located on the right handle bar (I.E. opening the throttle valve). As a result, the engine will be started. Rotate the handle 2 further to regulate the required fuel supply, then ride the vehicle forward.

To stop a vehicle powered by an apparatus mentioned above, first cut off the electrical power by pressing down the button 16 to stop the engine. Then, stop the vehicle after traveling for a certain distance. To stop the vehicle, hold the brake handle 17 (the same as on the common bikes or motorcycles), and, immediately after pressing down the button 16, actuate the brake means composed of the brake cam 18, the support shift 19 fixed in the box 31, the brake shoes 20 and the wall of the wheel hub (see FIG. 7), so as to make the two brake shoes 20 expand outwardly in the hub 10, causing a sudden stop.

What we claim is:

1. An apparatus, adapted for use in direct-driving wheels of minivehicles such as motorbikes or motor cycles, and in particular bicycles, comprising:
    a wheel axle, fixed to a vehicle frame;
    a wheel hub, rotatable about said wheel axle;
    a flywheel mounted on the outer periphery of said wheel hub and connecting to a pedal-driving mechanism;
    an engine, positioned inside said wheel hub and fixed on said wheel axle, the main journal axis of a crankshaft of said engine being offset from, and parallel to, said wheel axle;
    a transmission, disposed between said engine and the wheel hub, providing at least two stages of power reduction;
    a clutch means to automatically connect said transmission from said engine and said wheel hub during operation, said clutch means automatically disconnecting said transmission from said engine and said wheel hub when said engine is stopped; and
    an engine starting mechanism, disposed substantially inside said wheel hub, and attached to a first stage of said power reduction in said transmission unit for controllably transmitting the wheel hub rotation to the engine crankshaft.

2. An apparatus according to claim 1, wherein said power reduction in said transmission is composed of gears.

3. An apparatus according to claim 2, wherein said power reduction gears in said transmission are spiral tooth or herringbone tooth gears.

4. An apparatus according to claim 1 wherein said clutch means comprises a centrifugal friction clutch mounted on said engine crankshaft, a driven part of said clutch being fixed with a first stage gear of said power reduction.

5. An apparatus according to claim 4, wherein said clutch means further comprises an overrunning clutch, a driving part thereof being attached to the last stage of said power reduction, a driven part of said overrunning clutch being fixed or integrally formed with the inner wall of said wheel hub.

6. An apparatus according to claim 1, wherein said engine starting mechanism comprises:
    a starting gear, engaging with a gear in said first stage power reduction of said transmission;
    a second clutch means connecting said starting mechanism and power reduction gear to the engine crankshaft, and to the wheel hub respectively; and
    a clutch actuating mechanism to control the connection of said second clutch means.

7. An apparatus according to claim 6, wherein said second clutch means further comprises;
    a gear clutch, a first half thereof being attached to said wheel hub via a spline, said first half of said gear clutch being movable, under the control of said clutch actuating mechanism, to mesh with a second half thereof, said second half of said gear clutch being fixed to said first power reduction gear; and
    an overrunning clutch, disposed between said starting gear and said engine crankshaft, said driving part of said overrunning clutch being positioned on the inner periphery of said starting gear, said driven part of said clutch being formed by the cylindrical surface of said engine crankshaft.

8. An apparatus according to claim 7, wherein said clutch actuating mechanism comprises:
- a spring, to bias said gear clutch to a disengaged position;
- a transverse pin and a push rod, movably disposed in holes provided in said wheel axle;
- a lever connected to an outer end of said push rod; and
- a wire linking said lever to a manually operable handle.

9. An apparatus according to claim 1, wherein a magneto is provided on an end of said engine crankshaft, opposite to said end carrying said centrifugal frictional clutch and said starting gear, the distance between opposing gyro planes of said magneto said centrifugal frictional clutch being smaller than the diameter of the cylinder bore of the engine.

10. An apparatus according to claim 1, wherein said engine is a two-stroke gasoline engine, a top surface of a piston of said engine being formed with a spherical recess, a pair of lugs being provided at the inner side of said piston top to accommodate a piston pin; said piston having a thin wall, parts of which have openings near the axis of said piston pin and near the side walls of the engine crankcase.

11. An apparatus according to claim 1, wherein said wheel hub has two side walls supported by bearings on said wheel axle; said wheel axle being fixed to the vehicle frame; a boss ring also being provided on said wheel axle which protrudes from the engine body; said boss ring having inner passageways for introducing pipes and actuating means.

12. An apparatus according to claim 1, wherein said transmission is substantially enclosed by a gear box rigidly connected to the crankcase of the engine.

13. An apparatus according to claim 1, being further provided with brake means comprising:
- a brake cam;
- a pivot shaft attached on said gear box;
- a pair of brake shoes supported by said pivot shaft; and
- a brake drum formed by the inner peripheral wall of said wheel hub.

* * * * *